United States Patent [19]

Naito

[11] Patent Number: 4,846,298

[45] Date of Patent: Jul. 11, 1989

[54] DRIVING FORCE DISTRIBUTION CONTROL SYSTEM FOR 4WD VEHICLE

[75] Inventor: Genpei Naito, Yokosuka, Japan

[73] Assignee: Nissan Motor Co., Ltd., Yokohama, Japan

[21] Appl. No.: 254,626

[22] Filed: Oct. 7, 1988

[30] Foreign Application Priority Data

Oct. 14, 1987 [JP] Japan ............................ 62-259037

[51] Int. Cl.⁴ .................... B60K 17/344; B60K 23/08
[52] U.S. Cl. ................................. 180/233; 364/424.1
[58] Field of Search ............... 180/233, 247, 248, 249, 180/250; 364/424.1

[56] References Cited

U.S. PATENT DOCUMENTS

| | | | |
|---|---|---|---|
| 4,754,834 | 7/1988 | Ozaki et al. | 180/233 |
| 4,757,870 | 7/1988 | Torii et al. | 180/233 |
| 4,773,500 | 9/1988 | Naito et al. | 180/233 |
| 4,776,424 | 10/1988 | Naito | 180/233 |

FOREIGN PATENT DOCUMENTS

61-143927 9/1986 Japan.

Primary Examiner—John A. Pekar
Attorney, Agent, or Firm—Foley & Lardner, Schwartz, Jeffery, Schwaab, Mack, Blumenthal & Evans

[57] ABSTRACT

A driving force distribution control system for a 4WD vehicle includes a transfer clutch for continuously varying a front wheel driving force transmitted to front wheels, a sensor group for sensing a front wheel speed, a rear wheel speed and a vehicle speed, and a control unit for continuously controlling the front wheel driving force by controlling the engagement force of the transfer clutch. The control unit is arranged to vary the driving force distribution from a 2WD mode toward a 4WD mode in accordance with a front and rear wheel speed difference when the front wheel speed is higher than the rear wheel speed, and at the same time the vehicle speed is higher than a predetermined reference speed. Therefore, the control system can improve the stability of the vehicle during engine braking, and prevent tight corner braking at low vehicle speeds.

8 Claims, 7 Drawing Sheets

DRIVING FORCE DISTRIBUTION CONTROL SYSTEM FOR 4WD VEHICLE

REFERENCES TO RELATED APPLICATIONS

The following commonly-assigned U.S. applications relate to the subject matter similar to that of the present application. (1) Ser. No. 830,015, filed Feb. 18, 1986 now U.S. Pat. No. 4,757,870; (2) Ser. No. 820,055, filed Jan. 21, 1986 now U.S. Pat. No. 4,754,834; (3) Ser. No. 906,309, filed Sept. 12, 1986 now U.S. Pat. No. 4,773,500; (4) Ser. No. 893,245, filed Aug. 5, 1986 now U.S. Pat. No. 4,776,424; and (5) Ser. No. 127,319, filed Dec. 2, 1987.

BACKGROUND OF THE INVENTION

The present invention relates to a driving force distribution control system for controlling a transfer of a 4WD system.

The above-mentioned U.S. application Ser. No. 830,015 corresponding to Japanese patent provisional publication No. 61-191431 (Application No. 60-33286) shows a conventional example of the driving force distribution control system. This control system is arranged to vary the driving force distribution toward the 2WD state when the front wheel speed is higher than the rear wheel speed, and toward the 4WD state when the rear wheel speed is higher than the front wheel speed, in order to prevent both tight corner braking and wheel spin without causing an abrupt change in the steering characteristic.

Another conventional example is shown in Japanese Utility Model provisional publication No. 61-143927(Application No. 60-28503). A driving force distribution control system of this example is arranged to vary the driving force distribution gradually from the 2WD state toward the 4WD state during braking in order to improve the braking ability of the vehicle during engine braking without changing the steering characteristic abruptly.

However, the former system is arranged to vary the driving force distribution to the 2WD state when the front wheel speed is higher than the rear wheel speed. Therefore, the 2WD state is selected even when the accelerator is off, so that the braking torque due to engine braking is alloted only to the two wheels. Consequently, this conventional system tends to increase a tire slip ratio especially on a road surface of a low friction coefficient, and degrade the directional stability of a vehicle in straight ahead driving.

The latter system is arranged to vary the driving distribution to the 4WD state independently of the vehicle speed when the accelerator is off, and the front wheel speed is higher than the rear wheel speed. Therefore, this conventional system is unable to discriminate whether the excess of the front wheel speed over the rear wheel speed is caused by slip due to engine braking or by cornering. That is, this conventional system cannot prevent tight corner braking sufficiently.

SUMMARY OF THE INVENTION

It is an object of the present invention to provide a driving force distribution control system which can prevent the tight corner braking and improve a vehicle's stability during braking.

According to the present invention, a driving force distribution control system comprises clutch means (15,46), sensing means (41-43), and controller means (45, 100-106). The clutch means is provided in a drive system of the vehicle for transmitting a driving torque from an engine to front and rear wheels so that the clutch means can vary a driving force distribution between the front and rear wheels in response to a control signal. The sensing means comprises first sensor means for sensing a front wheel rotational speed $N_f$, second sensor means for sensing a rear wheel rotational speed $N_r$ and third sensor means for sensing a vehicle speed V of the vehicle. The controller means is a means for producing the control signal (i) to control the driving force distribution in accordance with signals supplied from the sensing means in such a manner that the driving force distribution is varied from a two-wheel drive state toward a four-wheel drive state in accordance with a front and rear wheel speed difference $\Delta N$ when the front wheel rotational speed is higher than the rear wheel rotational speed, and the vehicle speed is higher than a predetermined reference speed $V_0$.

When the vehicle speed is lower than the predetermined reference speed, the control system maintains the two-wheel drive state even if the front wheel speed is higher than the rear wheel speed. Therefore, the control system can prevent the tight corner braking when the front wheel speed exceeds the rear wheel speed because of a difference between cornering paths of the front and rear wheels at low vehicle speeds.

When the vehicle speed is equal to or higher than the reference speed, and the front wheel speed is higher than the rear wheel speed, the control system varies the driving force distribution from the two-wheel drive state toward the four-wheel drive state. Therefore, the control system can ensure the vehicle's stability by distributing the braking force to all the four wheels when engine brake is brought into operation by putting an accelerator into an idle position at a relatively high vehicle speed, and the front wheel speed exceeds the rear wheel speed because of slippage of the front wheels.

DETAILED DESCRIPTION OF THE INVENTION

One embodiment of the present invention is shown in FIGS. 1-10. A 4WD system of this embodiment is based on a rear wheel drive system.

Figure 1:
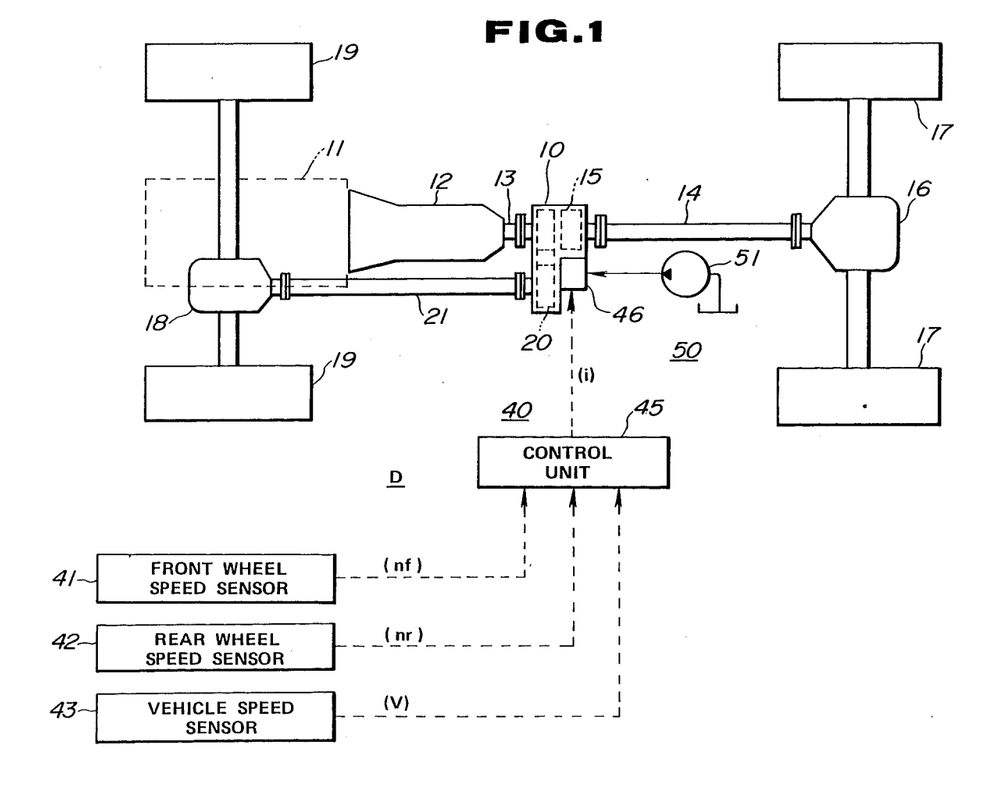
FIG. 1 is a schematic view showing a 4WD vehicle to which a driving force distribution control system according to one embodiment of the present invention is applied.

As shown in FIG. 1, a 4WD vehicle has a transfer 10, an engine 11, a transmission 12, a transfer input shaft 13, a rear drive shaft 14, a multiple disc friction type transfer clutch 15, a rear differential 16, rear wheels 17, a front differential 18, front wheels 19, gear train 20, and a front drive shaft 21.

Figure 2:
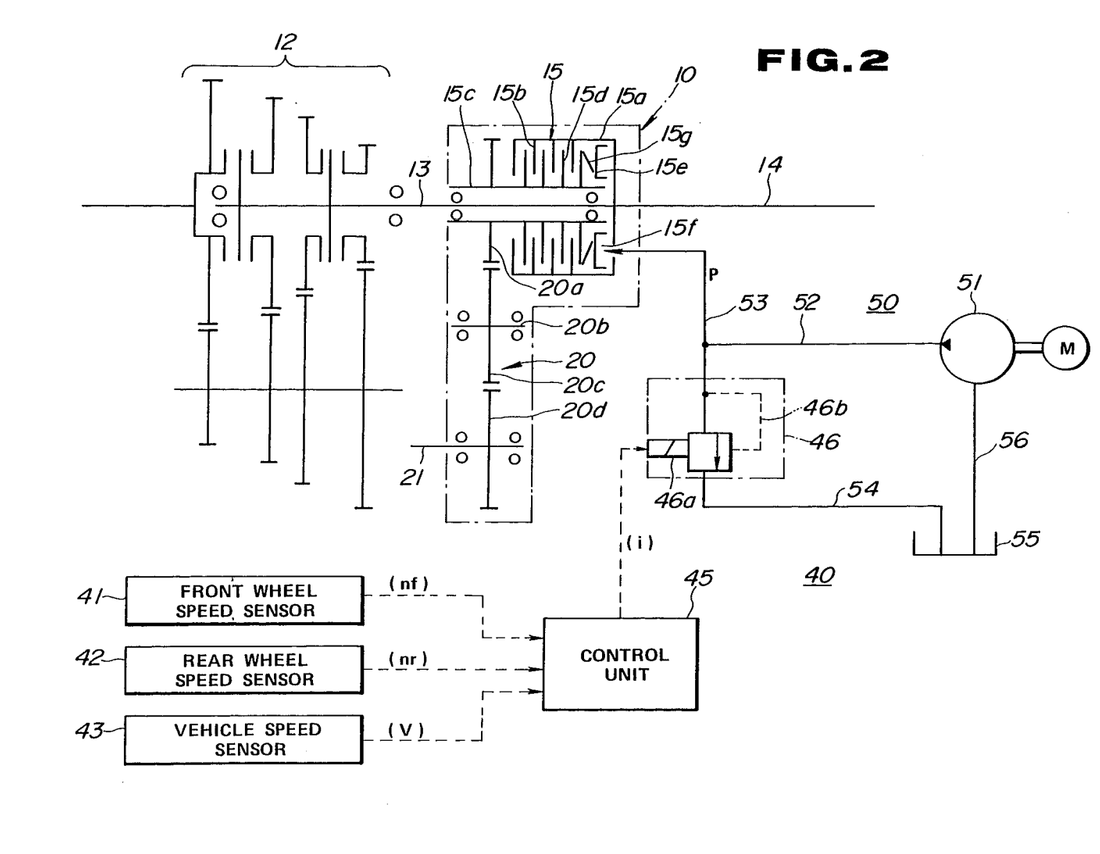
FIG. 2 is a schematic view showing the driving force distribution control system of the embodiment of the present invention.

The transmission 12 of this embodiment is of the type having two parallel shafts having various gears, as shown in FIG. 2.

The transfer input shaft 13 transmits an output torque of the transmission 12 to the transfer clutch 15 of the transfer 10.

The rear drive shaft 14 is colinear with the transfer input shaft 13, and both shafts are connected end to end so that the driving torque is transmitted directly from the transfer input shaft 13 to the rear drive shaft 14.

The transfer clutch 15 is arranged to continuously vary the driving torque transmitted to the front wheels 19. As shown in FIG. 2, the transfer clutch 15 includes a clutch drum 15a fixed to the transfer input shaft 13 and the rear drive shaft 14, a plurality of friction plates 15b, a clutch hub 15c, a plurality of friction discs 15d, a clutch piston 15e, and a cylinder chamber 15f. The friction plates 15b are engaged with the clutch drum 15a so that the friction plates 15b rotate with the clutch drum 15a. The clutch hub 15c is rotatably mounted on the transfer input shaft 13. The friction discs 15d are engaged with the clutch hub 15c so that the friction discs 15d rotate with the clutch hub 15c. The clutch piston 15e is provided at one end of an alternating series of the friction plates 15b and the friction discs 15d. The cylinder chamber 15f is formed between the clutch piston 15e and the clutch drum 15a.

The rear differential 16 is provided between the left and right rear wheels 17, and the front differential 18 is provided between the left and right front wheels 19. Each of the rear and front differentials 16 and 18 distributes the driving force between the left and right wheels 17 or 19 while permitting the left and right wheels to rotate at different speeds.

The gear train 20 has a first gear 20a provided on the clutch hub 15c, a second gear 20c provided on an intermediate shaft 20b, and a third gear 20d provided on the front drive shaft 21. When the transfer clutch 15 is engaged, the gear train 20 transmits the driving force from the transfer clutch 15 to the front drive shaft 21. The front drive shaft 21 is connected to the front differential 18, so that the driving force is transmitted to the left and right front wheels 19 through the front drive shaft 21 and the front differential 18.

Figure 3:
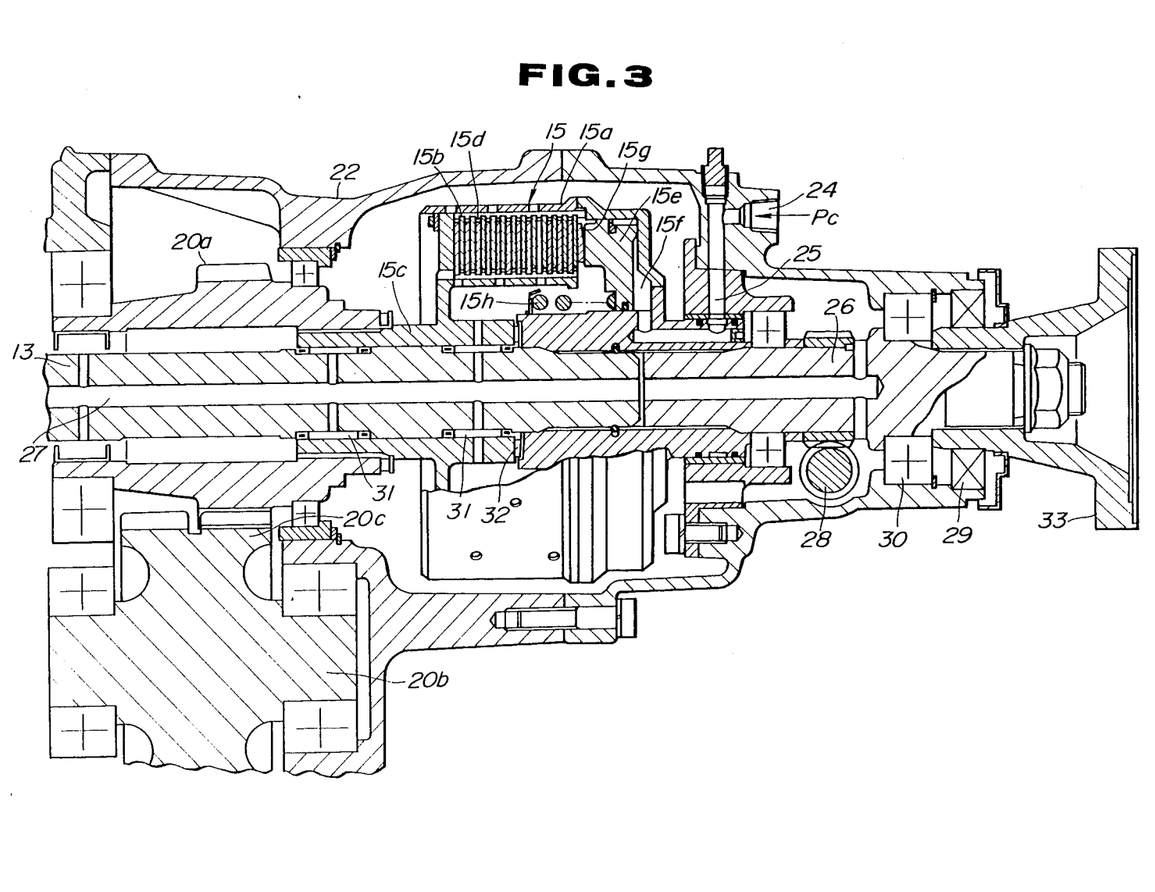
FIG. 3 is a sectional view of a transfer used in this embodiment.

FIG. 3 shows the transfer 10 of this embodiment more in detail. The transfer clutch 15, gears and shafts are enclosed in a transfer housing 22. As shown in FIG. 3, the transfer clutch 15 further has a dish plate 15g and a return spring 15h. In the transfer 10, there are further provided a clutch oil inlet port 24, a clutch oil passage 25, a rear output shaft 26, a lubricating oil passage 27, a speedometer pinion 28, an oil seal 29, a bearing 30, needle bearings 31, a thrust bearing 32, and a coupling flange 33. In this example, the transfer input shaft 13 and the rear drive shaft 14 are connected through the rear output shaft 26.

As shown in FIG. 1, a driving force distribution control system D of this embodiment includes a pressure source 50 for producing an oil pressure to engage the transfer clutch 15, and a pressure control device 40 for producing a clutch pressure P by controlling the oil pressure produced by the source 50.

As shown in FIG. 2, the pressure source 50 includes an oil pump 51, a pump pressure passage 52, a clutch pressure passage 53, a branch drain passage 54, reservoir tank 55, and a suction passage 56.

The pressure control device 40 includes an electromagnetic proportional relief valve 46 disposed in the drain passage 54. The relief valve 46 includes a solenoid 46a and a check oil passage 46b. The relief valve 46 serves as an actuator of the control system.

The driving force distribution control system D further includes a front wheel rotational speed sensor 41, a rear wheel rotational speed sensor 42, a vehicle speed sensor 43 and a control unit 45.

The front and rear wheel speeds can be sensed at various positions in the drive system by using various types of sensors. For example, the front and rear wheel speed sensors 41 and 42 are provided, respectively, in the front and rear drive shafts 21 and 14, and each sensor is composed of a sensor rotor fixed to the shaft 21 or 14, and a pickup disposed near the sensor rotor, for detecting change in magnetic force. Alternatively, each of the front and rear wheel speed sensors 41 and 42 may be disposed at or near the wheels 19 or 17. The front and rear wheel speed sensors 41 and 42 produce, respectively, front wheel speed signal (nf) and rear wheel speed signal (nr), which are sinusoidal signals, for example.

The vehicle speed sensor 43 senses a vehicle speed V, and produces a vehicle speed signal (v) representing the vehicle speed V.

Figure 4:
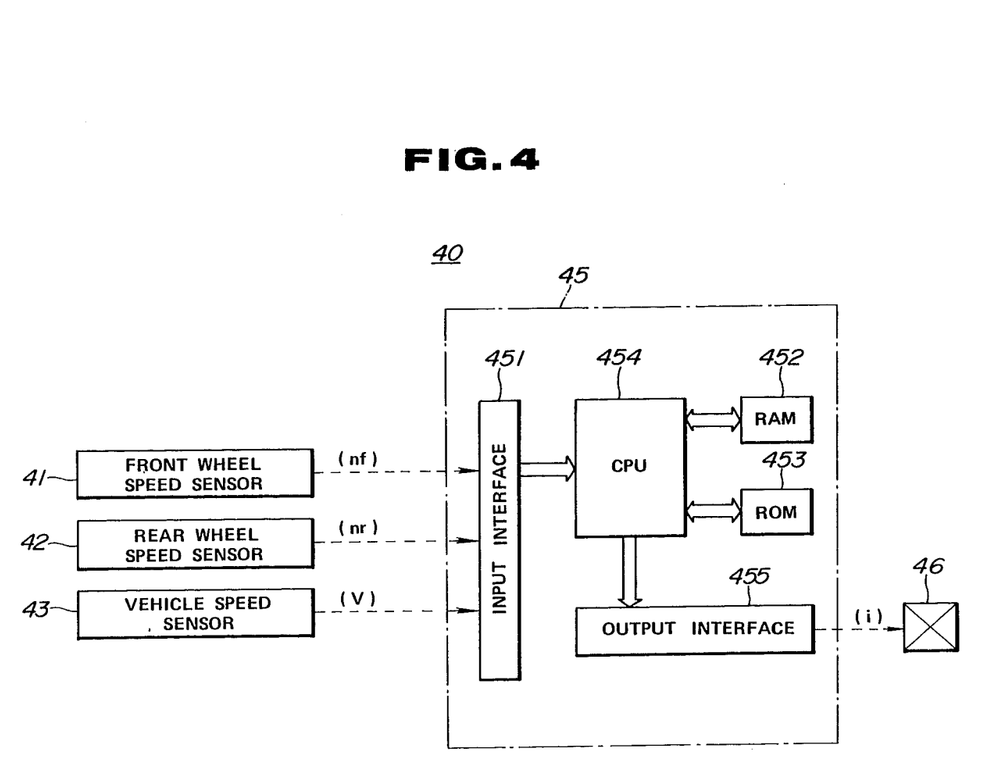
FIG. 4 is a block diagram showing a control unit of the driving force distribution control system of the embodiment.

In this embodiment, a main component of the control unit 45 is a microcomputer mounted on the vehicle. The main function of the control unit 45 is to calculate a front and rear wheel speed difference ΔN (=Nr−Nf) from the speed signals (nf) and (nr) delivered from the front and rear wheel speed sensors 41 and 42, and to performs an acceleration control and a deceleration control in dependence upon whether the speed difference ΔN is positive or negative. As shown in FIG. 4, the control unit 45 of this embodiment includes an input interface 451, a RAM 452, a ROM 453, a CPU 454 and an output interface 455. The ROM 453 is a read only memory for storing information required for the control.

Figure 5:
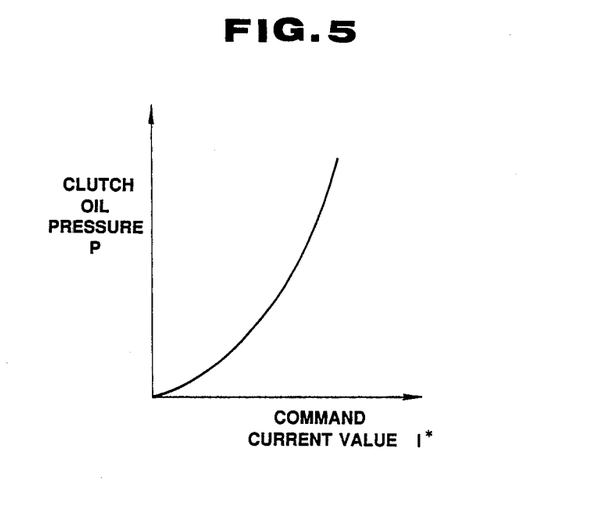
FIG. 5 is a graph showing a relationship between a clutch oil pressure and command current value, used in the control system of the embodiment.

The electromagnetic proportional relief valve 46 is controlled by a control current signal (i) produced by the control unit 45. The relief valve 46 makes the clutch pressure P equal to zero (P=0) when a command current value I* of the control signal (i) is equal to zero (I*=0). When the command current value I* of the control signal (i) is greater than zero, the relief value 46 decreases its opening degree, and controls the clutch pressure P in accordance with the command current value I*, as shown in FIG. 5, by controlling the oil flow through the drain passage 54.

Figure 6:
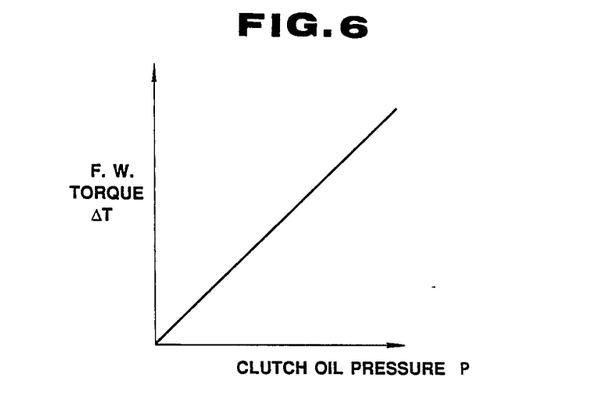
FIG. 6 is a graph showing a relationship between a front wheel driving torque $\Delta T$ and the clutch oil pressure P, used in the control system of the embodiment.
Figure 7:
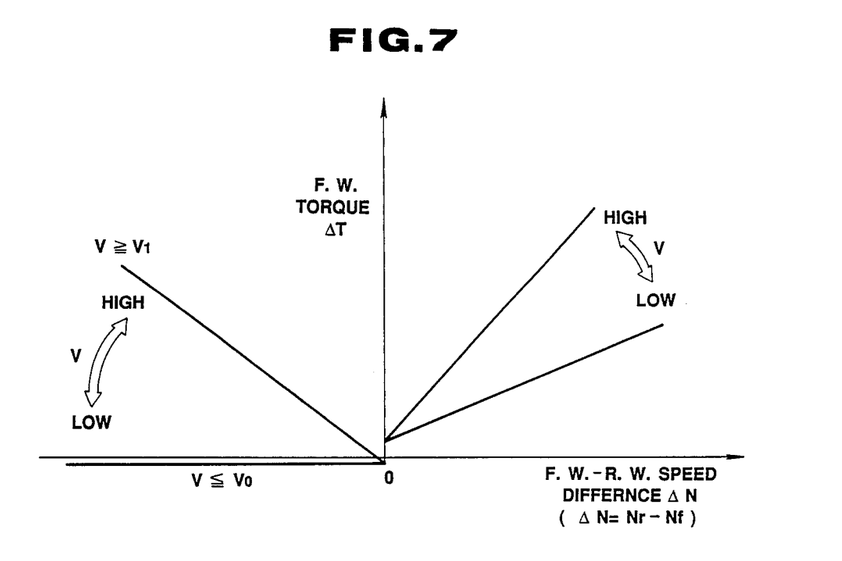
FIG. 7 is a graph showing control characteristics of the front wheel driving torque $\Delta T$ with respect to a front and rear wheel speed difference $\Delta N$, preliminarily set in the control unit of the embodiment.

A front wheel drive torque $\Delta T$ which is a torque transmitted through the transfer clutch 15 to the front wheels 19 is continuously varied in accordance with the clutch pressure P supplied to the transfer clutch 15, as shown in FIG. 6. A relationship between the clutch pressure P and the front wheel drive torque $\Delta T$ is expressed as:

$$P = \Delta T / (\mu \cdot S \cdot 2n \cdot Rm)$$

where $\mu$ is a friction coefficient between the friction plates and discs, S is an area of the piston on which the pressure is applied, n is the number of the friction discs, and Rm is a radius effective for torque transmission, of the friction discs. Thus, the front wheel drive torque $\Delta T$ is increased substantially in proportion to the clutch pressure P.

Figure 10:
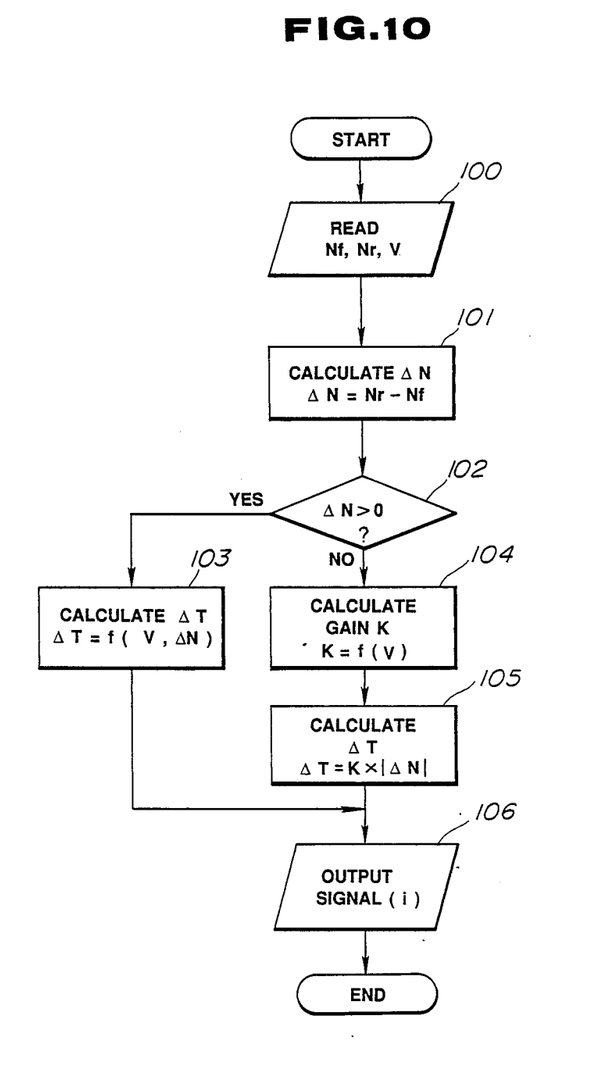
FIG. 10 is a flowchart showing a series of control operations performed by the control unit of the embodiment.

The driving force distribution control system of this embodiment is operated as follows:

FIG. 10 shows a control process performed by the control unit 45.

At a step 100 shown in FIG. 10, the control unit 45 reads the front wheel speed Nf, the rear wheel speed Nr and the vehicle speed V, supplied from the sensors 41, 42, 43.

At a step 101, the control unit 45 determines the front and rear wheel speed difference $\Delta N$ from the front and rear wheel speeds Nf and Nr obtained at the step 100. This operation is expressed by $\Delta N = Nr - Nf$.

At a step 102, the control unit 45 determines whether the speed difference $\Delta N$ is positive, or not. If $\Delta N$ is greater than zero, then the control unit 45 proceeds to a step 103 for acceleration control. If $\Delta N$ is equal to or smaller than zero, then the control unit 45 proceeds to steps 104 and 105 of deceleration control.

At the step 103, the control unit 45 determines the front wheel drive torque $\Delta T$ in accordance with the vehicle speed V and the speed difference $\Delta N$, by using an equation $\Delta T = f(V, \Delta N)$. That is, the front wheel drive torque $\Delta T$ is a function of V and $\Delta N$. In this embodiment, the front device torque $\Delta T$ is varied as shown in the right side of a graph of FIG. 7 in which the speed difference $\Delta N$ is greater than zero. When $\Delta N$ is greater than zero, the control unit 45 increases the front drive torque $\Delta T$ as the speed difference increases. In this example, $\Delta T$ is increased linealy with increase of $\Delta N$. In accordance with the vehicle speed V, the control unit 45 increases a gain which is a rate of increase of the front drive torque $\Delta T$. That is, the control unit 45 increases $\Delta T$ with increase of $\Delta N$ at a rate which is increased in accordance with the vehicle speed V. In this example, the front drive torque $\Delta T$ is increased continuously with increase of $\Delta N$ along a straight line whose slope is increased with increase of V.

Figure 8:
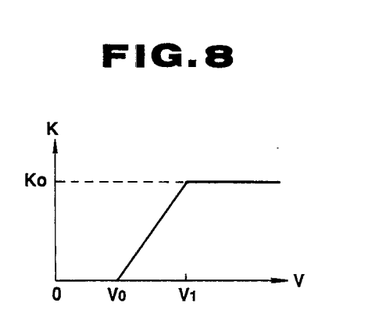
FIG. 8 is a graph showing a characteristic of a gain K with respect to a vehicle speed V, used in the control unit.
Figure 9:
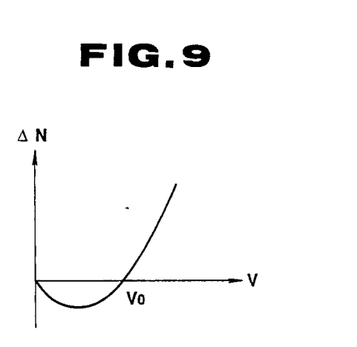
FIG. 9 is a graph showing a characteristic between the vehicle speed V and the front and rear wheel speed difference ΔN during cornering motion of the vehicle, used for determining a reference vehicle speed $V_0$ in the embodiment.

At a step 104, the control unit 45 determines a gain K of the deceleration control, in accordance with the vehicle speed V. The gain K is a rate of increase of the front drive torque $\Delta T$. The gain K is a function of the vehicle speed V, and expressed as $K = f(V)$. FIG. 8 shows a characteristic of the gain K used in this embodiment. As shown in FIG. 8, the gain K is equal to zero ($K = 0$) when the vehicle speed V is equal to or lower than a predetermined reference vehicle speed $V_0 (V \leq V_0)$. When the vehicle speed V is greater than the reference speed $V_0$, and smaller than a predetermined first vehicle speed $V_1$ ($V_0 < V < V_1$), the gain K increases gradually from zero to a predetermined limit value $K_0$ with increase of V. When the vehicle speed V is equal to or higher than the first speed $V_1 (V \geq V_1)$, the gain K is equal to $K_0$ ($K = K_0$). In this embodiment, the gain K increases linearly from zero to $K_0$ with increase of the vehicle speed V from $V_0$ to $V_1$. The reference vehicle speed $V_0$ is a vehicle speed at which the front and rear wheel speed difference $\Delta N (= Nr - Nf)$ produced by a difference between turning arcs of the front and rear wheels changes from negative to positive, as shown in FIG. 9. The front and rear wheel speed difference $\Delta N$ caused by a turn of the vehicle is negative when V is lower than $V_0$, and positive when V is higher than $V_0$, as shown in FIG. 9.

At a step 105 of FIG. 10, the control unit 45 determines the front wheel drive torque $\Delta T$ by using the front and rear wheel speed difference $\Delta N$ obtained at the step 101, and the gain K obtained at the step 104. The front wheel drive torque $\Delta T$ determined at the step 105 is equal to a product obtain by multiplying the absolute value of the front and rear wheel speed difference $\Delta N$ by the gain K. That is, $\Delta T = K \times |N|$. Therefore, the control unit 45 controls the front wheel drive torque $\Delta T$ as shown in the negative (left) side of the graph of FIG. 7 in which $\Delta N < 0$. The front wheel drive torque $\Delta T$ is held equal to zero independent of $\Delta N$ when the vehicle speed is equal to or lower than the reference speed $V_0$. When the vehicle speed V is higher than the reference speed $V_0$, the front drive torque $\Delta T$ increases as the absolute value of the speed difference $\Delta N$ increases. In the range in which $V_0 < V < V_1$, the front drive torque $\Delta T$ increases with increase of the absolute value of $\Delta N$ at a rate which is equal to the gain K and increases with increase of V.

At a step 106, the control unit 45 delivers the control signal (i) having a command current value i* to achieve the front wheel drive torque $\Delta T$ determined at the step 103 or the step 105.

As known from FIG. 10, the control unit 45 of this embodiment includes a first operational means for performing the step 101, a second operational means for performing the step 102, a third operational means for performing the steps 104 and 105, and a fourth operational means for performing the step 103.

In this way, the control system of this embodiment holds the torque $\Delta T$ transmitted to the front wheels equal to zero when the vehicle speed V is lower than the predetermined reference speed $V_0$, and the front wheel speed Nf is higher than the rear wheel speed Nr. Therefore, this control system can properly prevent the tight corner braking on turns at low vehicle speeds.

When the vehicle speed V is equal to or higher than $V_0$, and the front wheel speed Nf is higher than the rear wheel speed Nr, then the control system increases the tendency of the four wheel drive by increasing the front wheel drive torque $\Delta T$. Therefore, this control system can improve the vehicle's stability in straight ahead driving by distributing a braking force to all the four wheels during engine braking when the accelerator pedal of the vehicle is put at the idle position at a vehicle speed higher than $V_0$.

In this embodiment, the control system increases the front wheel drive torque $\Delta T$ gradually by increasing the gain K gradually, instead of changing the driving force distribution abruptly at the reference speed $V_0$ in an on-off control manner. Therefore, this control system can prevent an abrupt change in the steering characteristic of the vehicle on turns, and ensure the directional stability of the vehicle.

The clutch oil pressure can be controlled in various manners. For example, it is possible to employ a duty factor control system using a solenoid valve which opens and closes a fluid passage in response to a periodic pulse signal.

It is optional to use an electromagnetic clutch, or a clutch utilizing the viscosity of a fluid or other clutches in place of the multiple disc friction clutch of the illustrated embodiment.

What is claimed is:

1. A driving force distribution control system for a vehicle, comprising;
    clutch means provided in a drive system of the vehicle for transmitting a driving force from an engine of the vehicle to front and rear wheels so that said clutch means can vary a driving force distribution between the front and rear wheels in response to a control signal,
    sensing means comprising first sensor means for sensing a front wheel rotational speed, second sensor means for sensing a rear wheel rotational speed, and third sensor means for sensing a vehicle speed of the vehicle, and
    controller means for producing said control signal to control the driving force distribution in accordance with signals sent from said sensing means in such a manner that the driving force distribution is varied from a two-wheel drive state toward a four-wheel drive state in accordance with a front and rear wheel rotational speed difference when said front wheel rotational speed is higher than said rear wheel rotational speed, and said vehicle speed is higher than a predetermined reference speed.

2. A control system according to claim 1 wherein said clutch means comprises a transfer clutch capable of continuously varying a front driving force which is a driving force transmitted to the front wheels, said transfer clutch being disposed in a front wheel drive path so that the front driving force is reduced to zero when said transfer clutch is fully disengaged.

3. A control system according to claim 2 wherein said controller means comprises first operational means for determining said front and rear wheel speed difference which is a difference obtained by subtracting said front wheel rotational speed from said rear wheel rotational speed, second operational means for determining whether said front and rear wheel speed difference is positive, and third operational means for continuously increasing said front driving force as an absolute value of said front and rear wheel speed difference increases when said speed difference is negative, and at the same time said vehicle speed is higher than said predetermined reference speed, and holding said front driving force equal to zero when said speed difference is negative and at the same time said vehicle speed is smaller than said predetermined reference speed.

4. A control system according to claim 3 wherein said third operational means of said controller means determines, in accordance with said vehicle speed, a rate-of-increase at which said front driving force is increased with increase in the absolute value of said speed difference when said speed difference is negative, and increases said rate-of-increase from zero as said vehicle speed increases beyond said reference speed.

5. A control system according to claim 4 wherein said third operational means comprises means for determining a gain which is such a function of said vehicle speed that said gain is constantly zero when said vehicle speed is lower than said reference speed, said gain increases gradually from zero to a predetermined limit value as said vehicle speed increases from said reference speed to a predetermined first speed higher than said reference speed, and said gain is constantly equal to said limit value when said vehicle speed is higher than said first speed, and said third operational means further comprises multiplying means for determining said front driving force which is a product between said gain and the absolute value of said speed difference.

6. A control system according to claim 5 wherein said controller means further comprises fourth operational means for continuously increasing said front driving force as said speed difference increases from zero.

7. A control system according to claim 6 wherein, as said vehicle speed increases, said fourth operational means increases a rate-of-increase at which said front driving force is increased with increase in said speed difference when said speed difference is positive.

8. A control system according to claim 7 wherein said fourth operational means has a property of linearity such that said front driving force increases linearly with said speed difference, provided that said vehicle speed is constant.

* * * * *